June 14, 1932.  A. TURNER  1,863,076
FLUID PRESSURE ACTUATING MECHANISM
Filed Feb. 15, 1930  2 Sheets-Sheet 1
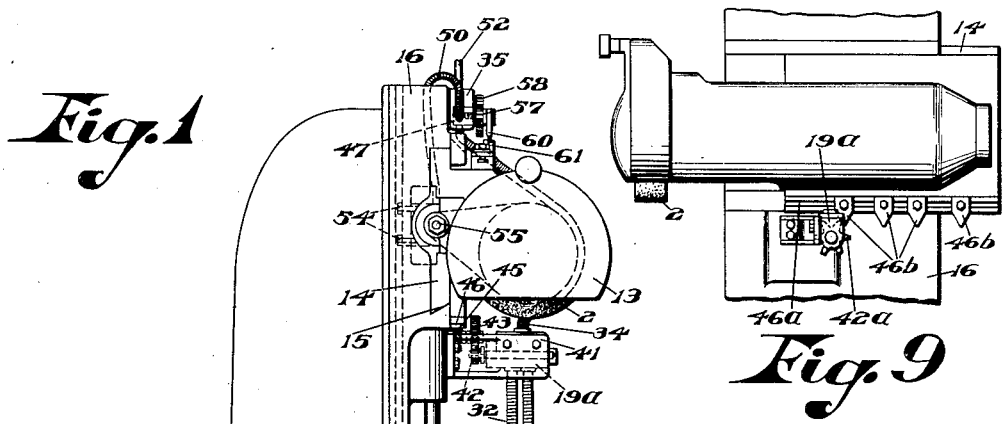
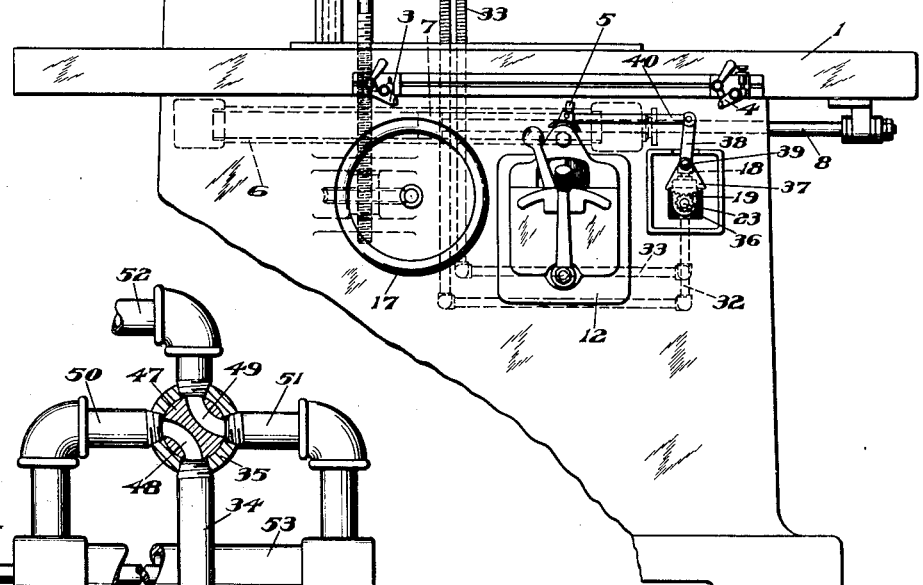
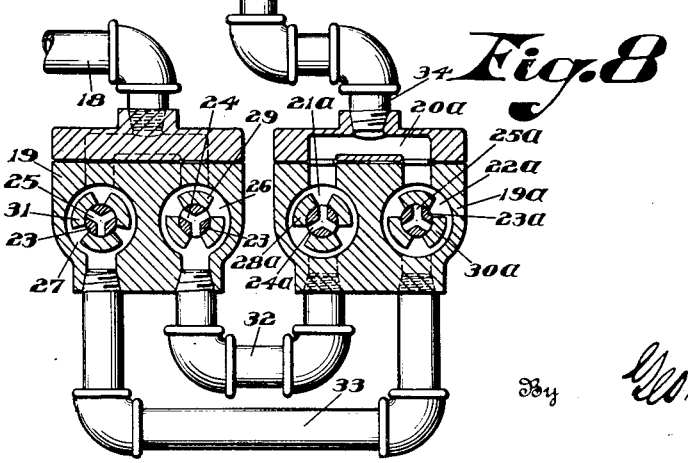
Inventor
Albert Turner
By Geo. H. Kennedy Jr.
Attorney June 14, 1932. A. TURNER 1,863,076
FLUID PRESSURE ACTUATING MECHANISM
Filed Feb. 15, 1930 2 Sheets-Sheet 2
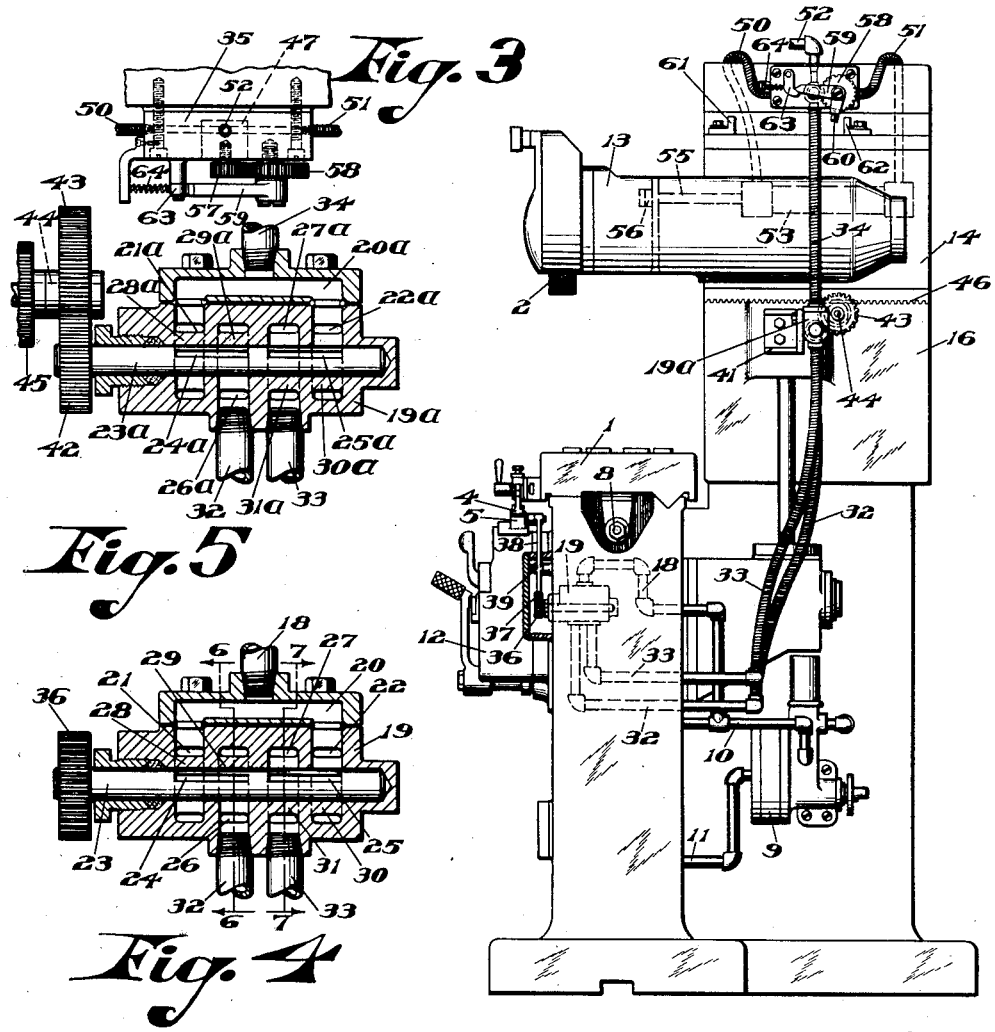
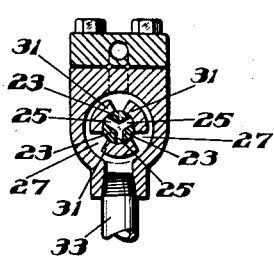
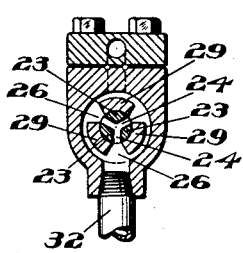
Inventor
Albert Turner
By Geo. H. Kennedy Jr.
Attorney Patented June 14, 1932

1,863,076

UNITED STATES PATENT OFFICE

ALBERT TURNER, OF SHREWSBURY, MASSACHUSETTS, ASSIGNOR TO THE HEALD MACHINE COMPANY, OF WORCESTER, MASSACHUSETTS, A CORPORATION OF MASSACHUSETTS

FLUID PRESSURE ACTUATING MECHANISM

Application filed February 15, 1930. Serial No. 428,789.

The invention relates to fluid pressure apparatus and contemplates the provision of mechanism adapted to intermittently meter and discharge quantities of fluid. One object of the invention is to provide mechanism whereby the fluid may be accurately metered and discharged.

Another object of the invention resides in the control of the metering apparatus by one or more reciprocating elements. According to this phase of the invention, the metering devices are set in one position by one reciprocating element and induce limited movement in another reciprocating element. The resultant movement of the second reciprocating element acts on the metering devices to prevent further movement until subsequent actuation of said metering devices by the original reciprocating element.

Specifically the invention is shown applied to a surface grinding machine, although it obviously has other uses. A surface grinding machine of the type shown in the accompanying drawings is adapted to grind a plane surface. To that end the grinding wheel is traversed in relation to the work-piece from one end thereof to the other, while an intermittent cross feed or rectilinear movement, in a direction at right angles to the primary reciprocating movement, is given to either the workpiece or the grinding wheel so that a succession of narrow cuts on the work piece may merge into a complete surfacing operation.

The feeding movements transverse to the continuous reciprocatory motion in a machine of this class are of considerably greater amplitude than the normal cross feed or cutting motion in an ordinary machine tool. Heretofore it has been the general custom to effect these feeding movements by hand. The present invention has considerable utility in machines of this class, because the cross feed is accurately measured off by the fluid pressure mechanism, which acts automatically and does not involve any cumbersome set of gearing.

Another object of the invention is to provide a metering mechanism which comprises two double sets of metering valves adapted to operate somewhat in the nature of an escapement, so that when the primary pair of valves are turned, fluid will flow in one direction and cause movement of an element which will turn a secondary pair of valves, cutting off the original path for the fluid, and disposing the valves in position to allow the fluid to pass only upon actuation, by some outside force, of the primary pair of valves. The above cycle is of course repeated indefinitely.

The above and other advantageous features of the invention will hereinafter more fully appear from the following detailed description, taken together with the accompanying drawings in which:

Fig. 1 is a fragmentary front elevation of a grinding machine having the apparatus of the invention applied thereto.

Fig. 2 is an end elevation of the grinding machine, taken from the right hand side of Fig. 1.

Fig. 3 is a top plan view of a certain reversing device.

Fig. 4 is a vertical sectional view taken through the casing of a certain double valve device.

Fig. 5 is a sectional view similar to Fig. 4, showing a similar but separate valve device and part of the mechanism that actuates it.

Fig. 6 is a vertical sectional view taken on the line 6—6 of Fig. 4.

Fig. 7 is a similar view taken on the line 7—7 of Fig. 4.

Fig. 8 is a diagrammatic view of the fluid pressure apparatus.

Fig. 9 is a fragmentary elevation of the vertical slide of the machine, showing a modified form of actuating mechanism for a certain valve device.

Like reference characters refer to like parts through out the drawings.

Refering to Figs. 1 and 2, the invention is shown applied, by way of example, to a grinding machine. This grinding machine provides the usual reciprocatory table or carriage 1 by the reciprocation of which the grinding traverse is produced between a rotating grinding wheel 2, and a workpiece carried by said table 1. Any usual or desired mechanism may be employed for reciprocating the table or carriage, such mechanism presumably being controlled by spaced adjustable dogs or stops 3 and 4 carried by the carriage 1, which alternately engage an interposed reversing lever 5, by the shifting of which the carriage 1 is directed first in one direction and then in the other. As indicated in the accompanying drawings, the carriage 1 is actually propelled in either direction by means of a cylinder 6, said cylinder 6 containing a piston 7 which is connected by means of a piston rod 8 to the carriage 1. The machine provides a fluid pressure pump 9 which is actuated from any suitable source of power, and piping 10 leads the fluid, drawn from a tank in the base through a pipe 11, to a suitable reversing valve on the front of the machine, which is located in a casing 12, said valve alternately directing the fluid to opposite ends of the cylinder 6 by means of piping, not shown. The reversing valve referred to is connected to and controlled by the reversing lever 5.

The parts so far described are simply those common to many types of grinding machines. The machine illustrated in the accompanying drawings is a surface grinder, and the grinding wheel 2 is mounted on the end of a spindle not shown, journalled in a suitable housing 13. This housing or wheelhead is carried on a slide 14 which is movable in ways 15 horizontally from the front to the back of the machine. The slide 14 is in turn carried by a vertically movable slide 16, by means of which the height of the grinding wheel may be regulated, a hand wheel 17 being provided to manually adjust the height.

When grinding a plane surface on a workpiece in a machine of this character, it is necessary to move the workpiece longitudinally with respect to the grinding wheel, until a path the width of the wheel has been ground in the work. As in the majority of cases the workpiece will be wider than this path, it is necessary to continue the grinding until a series of parallel cuts have been taken in the workpiece, these cuts being taken progressively across the surface, and at least slightly overlapping each other. In this way the whole surface of the workpiece is ground. Such an operation involves a transverse feeding of the grinding wheel in relation to the workpiece, which transverse feeding is very different from the depth cut taken by a wheel which is grinding deeper into a workpiece, as it is far greater in magnitude. Previously it has been customary for the operator to provide the transverse feed by manual operation of a hand wheel. The present invention contemplates the automatic actuation of this transverse feed by fluid pressure means which is adapted to feed the wheel a measured distance at each reversal of its reciprocation.

Referring to Fig. 2, the piping 10 that leads the fluid under pressure from the pump 9 to the usual reversing valve has a pipe 18 shunted into it which leads fluid to the top of a valve generally designated by the numeral 19. The valve 19 is one of a pair of similar valves, and is illustrated in the cross sectional view of Fig. 4. The piping 18 admits fluid to an upper chamber 20 which is in communication with end chambers 21 and 22. A rotatable valve member 23 is journaled in the casing 19 and extends through the chambers 21 and 22, passing through their geometric center. As shown by a comparison of the longitudinal sectional view of Fig. 4 (which however shows the valve 23 in elevation) and the cross sectional views of Figs. 6 and 7, the shaft 23 provides two independent sets of three longitudinal grooves in its surface, those on the left, Fig. 4, being located adjacent the end chamber 21 and being numbered 24, 24, 24, while those on the right lie adjacent the chamber 22 and are numbered 25, 25, 25.

The three grooves 24, and likewise the three grooves 25 may, if desired, be intercommunicating, as by extending them to the center of the shaft, or they might be independent of each other, but at all events they run parallel to the axis of the shaft 23 and are spaced apart 120° around the shaft. The grooves 24, however, do not communicate in any way with the grooves 25, as will be seen from an examination of Fig. 4.

The valve casing 19 likewise provides chambers 26 and 27 between the chambers 21 and 22, these chambers being circular in cross section and being coaxial with the chambers 21 and 22. The valve mechanism shown in Fig. 4 is adapted, in one position of the valve member 23, to connect together chambers 21 and 26 for passage of fluid, while in the other position of said valve member 23 it connects the chambers 22 and 27. To that end the casing 19 provides three cylindrical segments 28 located in the chamber 21 and spaced equally around the circumference of the shaft 23, the radii of the segments 28 being less than that of the cylindrical chamber 21. Also the chamber 26 provides three exactly similar segments 29 spaced in corresponding positions. The chamber 22 provides three cylindrical segments 30 which are the same as the segments 28 and 29, but are located in positions which are 60° displaced from the positions of the segments 28 and 29. The chamber 27 provides segments 31 which are in all respects similar to the segments 30.

It will therefore readily be seen, from an examination of Fig. 4 and the cross sectional views of Figs. 6 and 7, that fluid can flow along the grooves 24 from the chamber 21 to the chamber 26, because those grooves lie in the openings between the segments 28 and 29, but that in the position of parts shown in the drawings, fluid cannot flow between the chambers 22 and 27, because the grooves 25 are blocked by the segments 30 and 31 at both ends. It will be apparent that the valve mechanism described would operate in the same way if only one set of segments were provided around the slots 24 and only one around the slots 25, the provision of segments in all the chambers 21, 22, 26 and 27 simply serving to completely eliminate leakage of fluid.

The machine provides another valve mechanism which in construction is identical with the valve mechanism in casing 19. This other valve mechanism is shown in Fig. 5, and the various parts and passages for the fluid are indicated in that figure by numerals identical with the numerals in Fig. 4 with the addition of the suffix "a." Thus the casing is denoted 19a, and there is a chamber 20a which communicates with end chambers 21a and 22a, and a shaft 23a serves to connect these chambers 21a and 22a to chambers 26a and 27a by means of the grooves 24a and 25a and the other parts already fully described.

Fig. 8 shows the valve mechanism in casing 19 and the valve mechanism in casing 19a, but this being a diagrammatic illustration to make the invention readily apparent, the shafts 23 and 23a are each shown as broken into two pieces and the chambers 26 and 27 are shown as placed beside each other. In the right hand side of said Fig. 8, the chambers 22a and 21a are similarly shown in side-by-side relation.

Referring now to Figs. 1, 4, 5 and 8, the chamber 26 is connected by piping 32 to the chamber 26a while the chamber 27 is connected by piping 33 to the chamber 27a. It will be recollected that the pipe 18 supplies pressure fluid to the valve mechanism, connecting to the chamber 20. In similar fashion piping 34 connects to the chamber 20a and leads the pressure fluid, when it is allowed to flow, to a reversing valve 35. From an inspection of Fig. 8, it will be apparent that fluid can flow from the chamber 21, not illustrated therein, to the chamber 26, and so by way of the piping 32 to the chamber 26a, not illustrated therein, and then by way of the slots 24a to the chamber 21a and out by way of the chamber 20a to the piping 34. It will be likewise apparent that fluid cannot flow through the pipe 33 on account of the position of the slots 25 and 25a in relation to the segments 30, 31, 30a and 31a.

The shaft 23 of the valve mechanism in the casing 19 provides a gear 36 fastened thereto, this gear being in mesh with a segment 37 as shown in Figs. 1 and 2. In Fig. 2, part of the machine frame is shown in section to more clearly illustrate this mechanism, and in Fig. 1 the front of a certain casing is shown removed for the same purpose. The segment 37 is on the end of a lever 38 which is pivotally mounted at 39 on the machine frame. The upper end of said lever 38 is connected by means of a link 40 to the reversing lever 5. It will thus be apparent that at each reversal in the direction of travel of the table or carriage 1, the link 40 and lever 38 will be moved, and by means of the segment 37 and gear 36 angular movement will be imparted to the shaft 23.

The valve casing 19a, as shown in Figs. 1 and 2, is attached by means of a bracket 41 to the vertically movable slide 16. Referring to these figures and also to Fig. 5, the shaft 23a has a gear 42 fastened to its outer end, and this gear 42 meshes with a gear 43 on the end of a shaft 44 which is suitably journalled in the vertical slide 16. A gear 45 is also fastened to the shaft 44, and this gear 45 meshes with a rack 46 attached to or formed on the horizontal slide 14. Thus it will be apparent that movement of the horizontal slide 14 will be transmitted to the shaft 23a to move it angularly.

Referring again to Fig. 8, it will be recollected that the pipe 34 is connected to the valve 35. This valve 35 provides a valve member 47 having two passages 48 and 49 which are adapted to connect one of a pair of pipes 50 and 51 to the pipe 34, and the other of said pair of pipes to an exhaust pipe 52. As shown in Fig. 8 and also Fig. 2, the pipe 50 connects to the front end of a cylinder 53, while the pipe 51 connects to the rear end of said cylinder. The cylinder 53 is located in and carried by the vertical slide 16, being fastened to it for example by bolts 54, and said cylinder 53 provides a piston, not shown, on the end of a piston rod 55 which is attached at 56 to the housing 13 for the grinding wheel 2 or some other part of the horizontal slide 14. It will thus be seen that the slide 14 will be moved whenever fluid is admitted to the cylinder 53, its direction of movement depending upon the position of the valve member 47.

Incorporated with the machine is a device to cause a reversal of the direction of travel of the slide 14 when it has reached certain limits either of forward or rearward motion. In other words, the machine of the invention will continue grinding indefinitely, the carriage 1 having a continuous reciprocating movement, and the slide 14 having a series of short, quick, intermittent movements first in one direction for a given number of movements, and then in the other direction, the intermittent movements being reversed at the end of a definite limit of travel in either direction. To that end the movement in any one direction of the slide 14 is caused to shift the position of the valve member 47. Referring now to Figs. 2 and 3, the valve member 47, which is shown in dotted lines in Fig. 3, has attached to it a pinion gear 57. This pinion gear 57 meshes with a larger gear 58 to which is fastened a bell crank lever, one end of which comprises a dagger 59 and the other end of which comprises a reversing arm 60. The reversing arm 60 is in the path of adjustable dogs or stops 61 and 62, located on a portion of the slide 14, the valve 35 and associated mechanism being attached to a portion of the vertical slide 16.

The end of the dagger 59 is in contact with a spring snap-over device or detent 63 which is pressed by a spring 64 toward said dagger. This dagger and detent simply act to move the bell crank lever to the limit of motion whenever it passes the middle point in either direction, such devices being well known. Consequently, whenever the member 60, at one limit of the forward or rearward travel of the slide 14, is engaged by either of the dogs 61 or 62, the dagger 59 is first slowly moved and then rapidly snapped over to the opposite position, thus slightly moving the gear 58. Motion of the gear 58 is just sufficient to move the gear 57 and with it the valve member 47 through 90°, and this causes whichever pipe 50 or 51 had been connected to the pipe 34 to be then connected to the exhaust piping 52, and vice versa, thus reversing the flow of fluid against the piston in the cylinder 53.

The operation of the apparatus may best be understood by careful attention to Fig. 8. It has already been explained that when the parts of the mechanism are in the positions shown in the drawings, fluid will flow from the pipe 18 to the chamber 21, along the slots 24, into the chamber 26, and through the pipe 32 into the chamber 26a, and by way of the slots 24a to the chamber 21a, where it flows out through the passage 20a through the pipe 34 to the valve 35, flowing thence, for example, by the passage 48 into the pipe 50 and in the front end of the cylinder 53. This action will cause the piston and cylinder 53 to be moved, forcing the slide 14 rearwardly of the machine, and consequently moving the grinding wheel across the direction of travel of the carriage 1. But referring now to Figs. 2 and 5, such movement causes the rack bar 46 to turn the gear 45, and through the medium of gears 42 and 43 to turn also the shaft 23a. Movement of the shaft 23a causes the slots 24a to move into register with the segments 28a and 29a, and this cuts off the flow of the fluid. The same angular movement of the shaft 23a brings the slots 25a between the several segments 30a and 31a, and thus opens up passages between the chambers 22a and 27a, but fluid will not at that time flow through the pipe 33, because the grooves 25 are still blocked by the segments 28 and 29.

It therefore follows, that with the machine set as shown in the drawings, the slide 14 will be urged rearwardly, but will immediately stop after partial rotation of the shaft 23a. At the next reversal of the carriage 1, however, the reversing lever 5 will move just far enough to cause turning of the valve shaft 23, by means of the link 40, lever 38, segment 37 and gear 36, 60°, which will locate the grooves 25 betwen the segments 30 and 31, and place the grooves 24 in register with these segments. Fluid will therefore flow through the pipe 33, but will be prevented from flowing through the pipe 32. It will thus be seen, without further description, that the slide 14 will be given a horizontal movement at each reversal of the carriage 1, and that intermittent movement of said slide will continue in either direction, until one of the dogs 61 or 62 contact with the lever 60, which will simply act to reverse the direction of this intermittent movement, as already described.

It should be noted that the particular form and arrangement of the slots in the shafts 23 and 23a, and of the segments in the casings 19 and 19a represent simply one form of carrying the invention into practice. Any other device or devices whereby fluid can be opened up to travel in one path while being cut off from travelling in another path to effect the results stated herein will suffice to carry out the invention, the essence of which is set forth in the following claims.

Referring now to Fig. 9, a modified mechanism for rotating the valve shaft 23a is therein disclosed. In this figure, which shows the vertical slide 16 in elevation and the horizontal slide 14, and so many only of the other parts of the machine as is necessary to understand the modification, a dove tailed groove portion 46a or the like is provided in place of the rack bar 46. By means of this dove tailed groove portion 46a the slide 14 adjustably carries a plurality of dogs or strikers 46b. The valve shaft 23a has fastened to it a star wheel 42a preferably having six points. It will be seen that when one of the strikers 46b engages the star wheel 42a during the motion of the slide 14, the shaft 23a will be turned through one sixth of a revolution, or sixty degrees, which will thus place it in position to cut off the flow of fluid until the valve 23 is again actuated.

The particular advantage of the mechanism shown in Fig. 9 over that illustrated in Figs. 2 and 5 is that the travel of the slide 14 at each reversal of the carriage 1 may be adjusted. By that is meant that the distance which the slide moves at any given time may be adjusted from a certain minimum up to the limit of motion of the slide, and separate movements may be caused to be of different length. This adjustability is very advantageous and saves a great deal of time where it is desired to grind various surfaces on a piece of work which are irregularly spaced across it.

I claim:—

1. In apparatus of the class described, the combination with a periodically actuated element, fluid pressure actuating mechanism, and a second element adapted to be actuated by said fluid pressure actuating mechanism, of valve means to cause said second element to be operated when said valve means are moved by said first element, and valve means responsive to movement of said second element to cut off the flow of fluid.

2. In apparatus of the class described, a pair of valve devices connected to operate together, a second pair of valve devices connected to operate together, means to actuate the first pair of valve devices, fluid pressure means regulated by said valve devices connected to said second pair of valve devices to actuate them, the primary pair of valves being adapted to open up a path for the fluid which the secondary valves close, and a second path being thus opened for the fluid by the operation of the fluid pressure operated means and by the subsequent actuation of the means to operate the primary pair of valves.

3. In apparatus of the class described, an element which is alternately shifted back and forth, a pair of valves controlled by said element, so that in a given position of said valves one valve is opened and the other valve is shut, and in the other position of said valves, the first valve is shut and the second valve is opened, means adapted to be actuated by fluid under pressure, a second set of valves functionally like the first set of valves, connections between said means adapted to be operated by said fluid under pressure to change the position of said second set of valves, whereby to cause intermittent actuation of said means operated by fluid under pressure.

4. In a grinding machine, the combination with a table or carriage, means to operate it, and a transverse slide, of fluid pressure motor means to actuate said transverse slide, a valve device actuated at reversals of said carriage, and a valve device actuated by said slide and being arranged to be opened or closed in response to movement of said slide, the valve devices being arranged to cause limited intermittent motion of said slide responsive to reversals of said carriage.

5. In a grinding machine, the combination with a table or carriage, means to reciprocate said table or carriage, a transverse slide and fluid pressure motor means to actuate said said transverse slide, of a valve device, connections between said valve device and the means to reciprocate said carriage, a second valve device and connections between said second valve device and the aforesaid slide, the first valve device being arranged to be opened or shut upon reversal of said carriage, and the second valve device being arranged to be opened or shut upon movement of said slide.

6. In apparatus as claimed in claim 5, the combination with the parts therein specified, of a second pair of valve devices, the one connected to the reciprocating mechanism for the carriage, and the other connected to the slide, and arranged to operate oppositely to the first pair of valve devices, whereby to cause the slide to move intermittently.

7. In a grinding machine, a slide, movement of which procures relative movement between a grinding wheel and a workpiece, a fluid pressure motor to move said slide, valve apparatus to admit limited quantities of fluid to said motor to move said slide, and an additional reversing valve and means associated with said slide to operate it, whereby to induce intermittent movement of said slide and reversals of said intermittent movement after a limited travel in either direction.

8. In a grinding machine, a slide, movement of which procures relative movement between a grinding wheel and a workpiece, a fluid pressure motor to move said slide, a valve apparatus which when actuated causes movement of said slide, a second valve apparatus which when moved causes said slide to stop, and adjustable means provided by said slide to actuate said second valve apparatus whereby to make separate movements of said slide of different length.

9. In apparatus of the class described, a reciprocating element, a slide, a fluid pressure motor to actuate said slide, a pair of valve devices mechanically connected together in fluid pressure parallel relation, and actuated by said element, a second pair of valves similarly connected together, actuated by said slide, said first and second pair of valves being interconnected whereby to procure intermediate motion of the slide.

10. In apparatus of the class described, a reciprocating element, a slide, a fluid pressure motor to actuate said slide, a pair of valve devices mechanically connected together in fluid pressure parallel relation, so that one valve is open when the other is closed, said valve being actuated by said element, a second pair of valves similarly connected together and actuated by said slide, said first and second pairs of valves being interconnected whereby to procure intermittent motion of the slide in response to movement of said reciprocatory element.

11. In a grinding machine, a slide, movement of which procures relative movement between a grinding wheel and a workpiece, a fluid pressure motor to move said slide, a valve apparatus which when actuated causes movement of said slide, a second valve apparatus which, when moved in response to movement of said slide, causes said slide to stop, and adjustable means provided by said slide to actuate said second valve apparatu whereby to procure separate movements of said slide of different lengths.

ALBERT TURNER.